(12) United States Patent
Lokkinen

(10) Patent No.: US 9,908,301 B2
(45) Date of Patent: Mar. 6, 2018

(54) METHOD AND ARRANGEMENT FOR TREATMENT OF LINER SLEEVE

(75) Inventor: Mika Lokkinen, Porvoo (FI)

(73) Assignee: PICOTE OY LTD, Porvoo (FI)

( * ) Notice: Subject to any disclaimer, the term of this patent is extended or adjusted under 35 U.S.C. 154(b) by 457 days.

(21) Appl. No.: 13/992,300

(22) PCT Filed: May 3, 2011

(86) PCT No.: PCT/FI2011/050403
§ 371 (c)(1),
(2), (4) Date: Jun. 28, 2013

(87) PCT Pub. No.: WO2011/138508
PCT Pub. Date: Nov. 10, 2011

(65) Prior Publication Data
US 2013/0299068 A1 Nov. 14, 2013

(30) Foreign Application Priority Data

May 4, 2010 (FI) ..................... 20105480

(51) Int. Cl.
*E04B 2/00* (2006.01)
*E04F 13/00* (2006.01)
(Continued)

(52) U.S. Cl.
CPC ............ *B29D 23/003* (2013.01); *B29C 63/34* (2013.01); *F16L 55/1654* (2013.01);
(Continued)

(58) Field of Classification Search
CPC ....... B29C 63/26; B29C 63/34; B29C 63/341; B29C 65/00; B29C 65/48; B29C 33/485;
(Continued)

(56) References Cited

U.S. PATENT DOCUMENTS 5,044,405 A    9/1991 Driver et al.
5,706,861 A *  1/1998 Wood et al. ................... 138/98
(Continued)

FOREIGN PATENT DOCUMENTS

JP    06234161        8/1994
JP    2005342958 A    12/2005
WO    03/031857 A2    4/2003

OTHER PUBLICATIONS

International Search Report for International Patent Application No. PCT/FI2011/050403 dated Aug. 24, 2011.
(Continued)

*Primary Examiner* — Philip Tucker
*Assistant Examiner* — Brian R Slawski
(74) *Attorney, Agent, or Firm* — Barnes & Thornburg LLP

(57) ABSTRACT

A method for preparing a resizing sleeve for lining a joining point in a pipe assembly having pipes of thicker and thinner diameter. The method includes stretching the resizing sleeve in diameter to the size of the thicker pipe in diameter of the pipe assembly, installing an installation hat according to the thicker pipe in diameter of the pipe assembly by airtightly gluing it onto the stretched resizing sleeve, and returning the resizing sleeve to the size of the thinner pipe in diameter of the pipe assembly to be lined. A suitable tool for implementing the method is also disclosed.

5 Claims, 3 Drawing Sheets

Figure 1A:
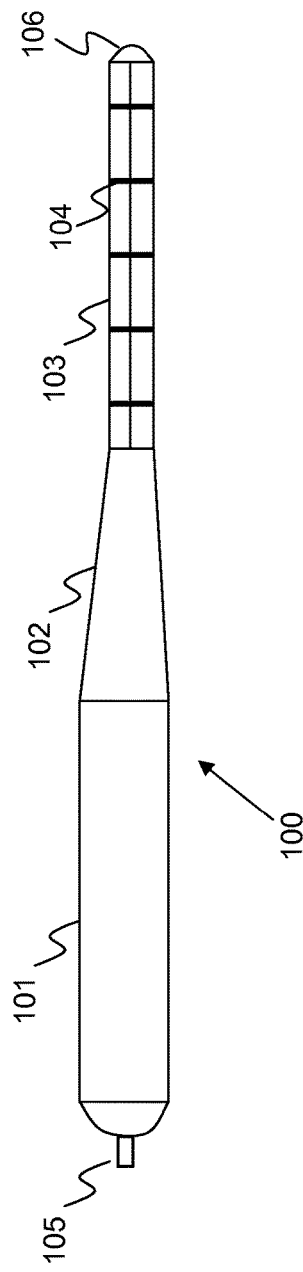

(51) Int. Cl.
    *B29C 73/00*     (2006.01)
    *B32B 43/00*     (2006.01)
    *B65C 3/26*     (2006.01)
    *B29C 65/00*     (2006.01)
    *B32B 37/00*     (2006.01)
    *B29D 23/00*     (2006.01)
    *B29C 63/34*     (2006.01)
    *F16L 55/165*     (2006.01)
    *F16L 55/179*     (2006.01)
    *F16L 55/18*     (2006.01)
    *B29C 65/48*     (2006.01)
    *B29C 63/00*     (2006.01)

(52) U.S. Cl.
    CPC ............. *F16L 55/179* (2013.01); *F16L 55/18* (2013.01); *B29C 63/0086* (2013.01); *B29C 65/482* (2013.01); *B29C 65/4835* (2013.01); *B29C 66/24225* (2013.01); *B29C 66/5221* (2013.01)

(58) Field of Classification Search
    CPC ....... B29C 33/505; B29C 70/00; B29C 70/04; B29C 70/18; B29C 70/446; F16L 55/1653; F16L 55/1654; F16L 55/179; F16L 55/18
    USPC ..... 156/60, 71, 94, 156, 160, 165, 229, 285, 156/287, 293, 294, 296, 349, 423, 494; 264/500, 563, 564, 565, 572, 573; 425/392, 393, 403; 249/65, 82, 175, 117, 249/155, 157, 160, 161
    See application file for complete search history.

(56) References Cited

U.S. PATENT DOCUMENTS

| | | | | |
|---|---|---|---|---|
| 5,780,123 | A | * | 7/1998 | Kamiyama ............. B29C 65/62 138/150 |
| 5,901,752 | A | * | 5/1999 | Lundman ............. F16L 55/134 138/89 |
| 6,619,886 | B1 | * | 9/2003 | Harrington ............. B29C 63/36 138/97 |
| 2006/0243337 | A1 | * | 11/2006 | Manners ......................... 138/98 |
| 2008/0169036 | A1 | | 7/2008 | Kamiyama et al. |

OTHER PUBLICATIONS

International Preliminary Report on Patentability for International Patent Application No. PCT/FI2011/050403; dated Nov. 6, 2012.
Supplementary European Search Report for European Patent No. 11 77 7328 dated Mar. 13, 2015.

* cited by examiner

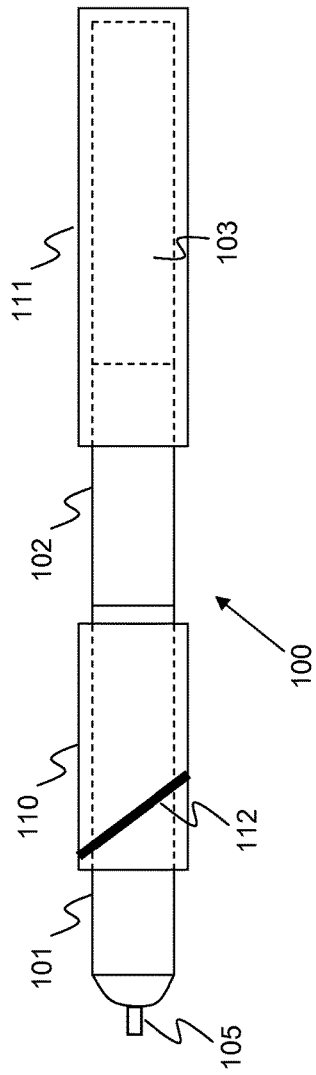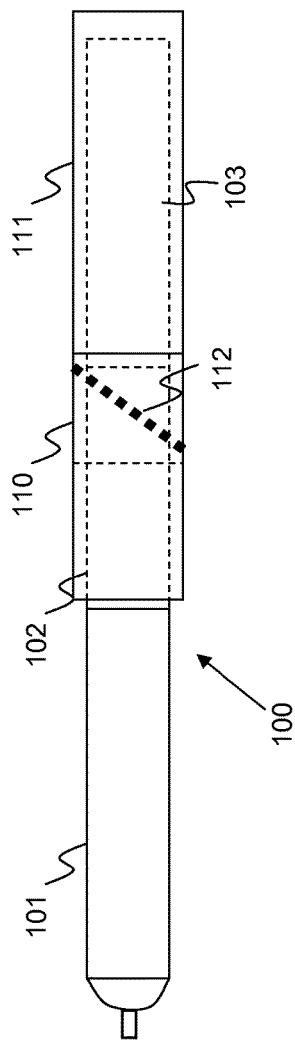

METHOD AND ARRANGEMENT FOR TREATMENT OF LINER SLEEVE

PRIORITY CLAIM

This patent application is a U.S. National Phase of International Patent Application No. PCT/FI2011/050403, filed 3 May 2011, which claims priority to Finnish Patent Application No. 20105480, filed 4 May 2010, the disclosures of which are incorporated herein by reference in their entirety.

FIELD OF THE INVENTION

The invention relates to the treatment for installation of a liner sleeve for a pipe, such as a sewer pipe.

PRIOR ART

Pipes, for example, sewer pipes, can be renovated, for example, by lining the inner surface of the pipe with a suitable lining material. One lining material of this type is a polyester sleeve saturated with epoxy resin.

The polyester sleeve can be a so-called "resizing sleeve", which is suitable for lining pipes that are of different thicknesses in diameter. A resizing sleeve is in structure such that it stretches as needed to line a pipe thicker in diameter than what the diameter of the sleeve normally is (in an unstretched state). When unstretched, the sleeve can be, for example, 70 mm in diameter and 100 mm when stretched. Thus, the same sleeve is suitable for lining the inner surface of both 70 mm and 100 mm pipes.

In the pipe assemblies to be lined, there can be joining points, in which a pipe of thinner diameter is joined to a pipe of thicker diameter. One joining point of this kind can be, for example, in the sewerage of a residential building, for example, a multi-storey apartment house, where in branch lines leaving from apartments are used pipes that are thin in diameter, which are joined to a trunk line of thicker diameter. When lining such a joining point, nowadays separate liner elements are used that are formed and sized to be suitable for the joining point. Installation of these elements in place such that the results of the installation work meet the quality standards demanded of it, has proven difficult. In the event that a mistake occurs while installing the element and the liner element, for example, attaches poorly to the joining point, the element must be removed from the joining point, for example, by sanding and, after this, a new liner element must be installed in its place.

A joining point according to prior art can also be lined with a so-called overlapped sleeving, if both pipes of the pipe assembly are of the same thickness. In this case, a separate liner element is not required at the joining point, rather the sleeve used for lining of the branch line extends also for a suitable distance into the trunk line. When the liner sleeve has attached to the branch- and trunk lines after the epoxy resin has dried, the branch line blocked by the liner sleeve is drilled open with a suitable machining tool.

In solutions according to prior art, no method or tools are taught, using which overlapped sleeving can also be done in such a pipe assembly, in which the diameter of the branch line is smaller than that of the trunk line and in which a resizing sleeve is thus needed to do an overlapped sleeving.

OBJECT OF THE INVENTION

The object of this invention is to present a method and tool for preparing a resizing sleeve for overlapped sleeving of a joining point of a sewer pipeline.

BRIEF DESCRIPTION OF THE INVENTION

The first aspect of the invention is a method for preparing a resizing sleeve for installation.

In a method according to the invention, a resizing sleeve is stretched by a preparation tool to the diameter of the thicker pipe. After this, onto the stretched resizing sleeve is airtightly installed by gluing an installation hat according to the diameter of the thicker pipe and made from essentially unstretched material. Next, the resizing sleeve is returned to the size of the pipe of thinner diameter and detached from the preparation tool.

In one embodiment of the invention, the prepared resizing sleeve is installed in a sewer pipe assembly that comprises sewer pipes of thinner and thicker diameter as well as a joint between these. In the installation, the prepared resizing sleeve saturated with epoxy resin is transported into the sewer pipe, for example, with overpressure arranged into the sleeve. Overpressure is maintained in the pipe, until the resizing sleeve has cured and attached to the sewer pipe to be lined. After this, the pressure in the pipe is lowered to the ambient air pressure and the installation hat is removed, for example, by pulling on a rope attached to the hat. Finally, the pipeline of thicker diameter is drilled open using a drill suitable for this purpose, and the walls of the pipe of thicker diameter are sanded in the area of the joint.

The second aspect of the invention is a tool suitable, for example, for implementing the method according to the invention. The tool is characterized in that it comprises an airtight preparation pipe that expands under the influence of air pressure arranged in the tool to the size of the thicker pipe in diameter in the pipe assembly to be lined. The preparation pipe comprises longitudinally three possibly partially overlapping areas: an installation hat preparation area, an installation hat installation area and a resizing sleeve stretching area.

The resizing sleeve stretching area can comprise preparation pipe constriction means, for example, tapes or flexible bands wound around the pipe, by means of which the diameter of the preparation pipe can be temporarily constricted smaller such that when the resizing sleeve is pulled onto the preparation pipe and overpressure is created in the preparation pipe for stretching the resizing sleeve, the preparation pipe expands to its final diameter such that the resizing sleeve is exposed to as even a pressure as possible as it is stretched and, due to this, the resizing sleeve is not damaged. One suitable means of constricting the preparation pipe is pleating of the pipe in the direction of its longitudinal axis, by means of at least two pleats, for example, into at least three layers.

The installation area of the hat can have a stabilization sleeve corresponding to the resizing sleeve in durability and/or deformation characteristics, for example, stretchability. In one embodiment, the stability sleeve is in structure and material like the resizing sleeve, for example, a piece of the same resizing sleeve as is prepared for installation using the tool. One task of the stabilization sleeve is to assure that the resizing sleeve being prepared becomes, along its entire length, smoothly seated onto the preparation pipe in order that the installation hat can be attached, for example, by airtightly gluing it onto the resizing sleeve.

One preferred embodiment of the presented method and system is presented in the following detailed description of the invention.

DETAILED DESCRIPTION OF THE INVENTION

Figure 1B:
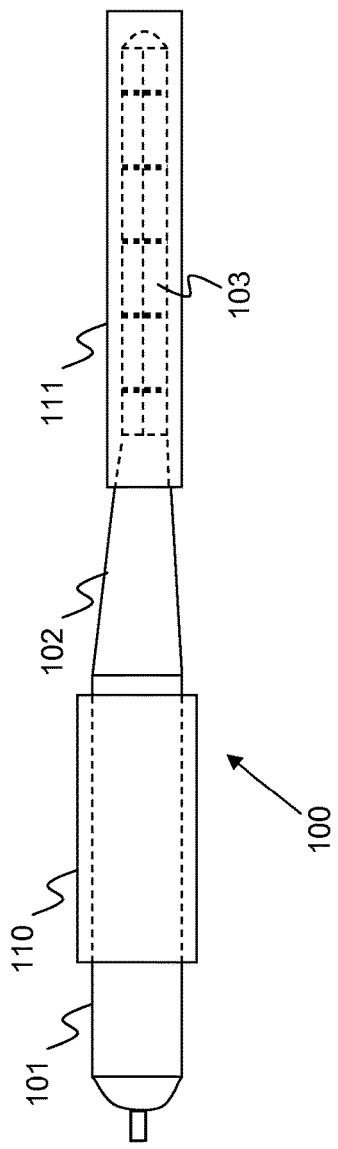
Figure 2C:
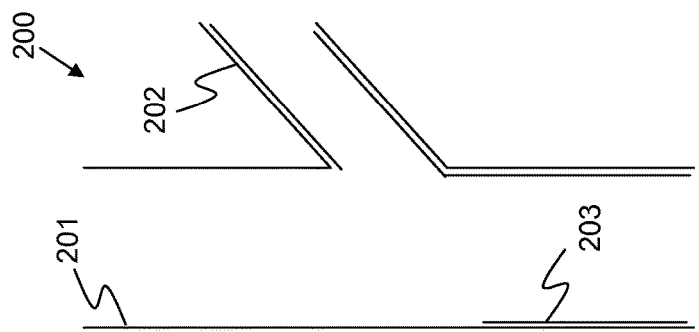
Figure 2B:
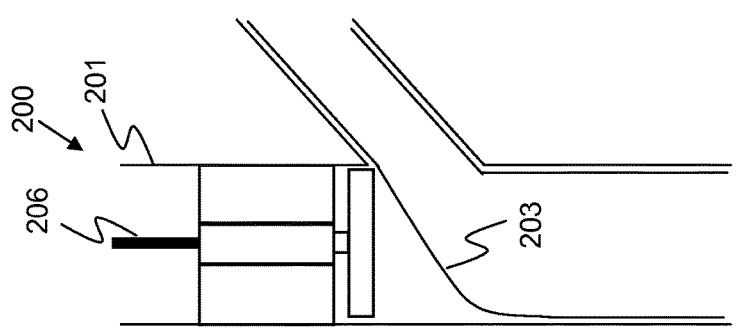
Figure 2A:
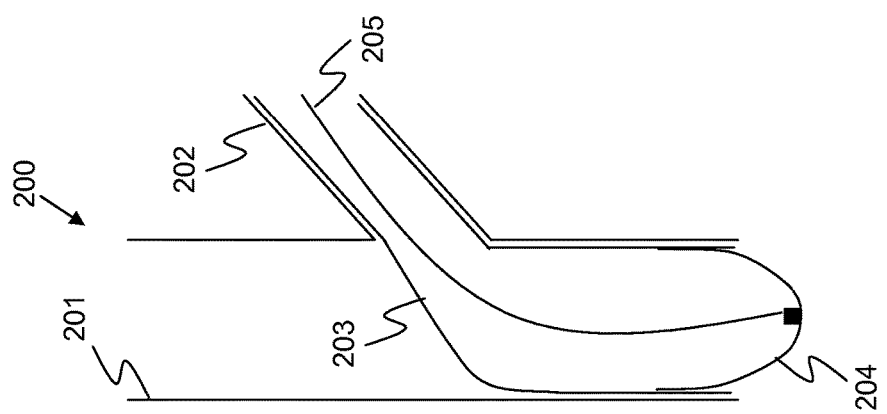

In the following, the invention is described in greater detail with reference to the exemplified preferred embodiments and accompanying figures, in which FIG. 1a shows the resizing sleeve preparation tool according to one embodiment of the invention, FIG. 1b shows the first stage of operation in using a tool according to one embodiment of the invention, FIG. 1c shows the second stage of operation in using a tool according to one embodiment of the invention, FIG. 1d shows the third stage of operation in using a tool according to one embodiment of the invention FIG. 2a shows the first stage of operation in installing a prepared resizing sleeve in a pipe assembly to be renovated, FIG. 2b shows the second stage of operation in installing a prepared resizing sleeve in a pipe assembly to be renovated, and FIG. 2c shows the resizing sleeve installed in a pipe assembly to be renovated.

FIG. 1a shows a tool according to one preferred embodiment of the invention for preparing a resizing sleeve for installation. The tool comprises a pipe of a flexible, but essentially inelastic material, for example, plastic, which comprises in its longitudinal direction three zones: an installation hat preparation area 101, an installation hat installation area 102 and a resizing sleeve stretching area 103. The installation hat installation area 102 can comprise a stabilization sleeve, which can be, for example, a suitably sized piece of the resizing sleeve that is intended to be prepared for installation using the tool. In the area of the resizing sleeve stretching area 103, the pipe of the tool is constricted, for example, into three layers by the use of pleating and tapes 104 such that the diameter of the pipe is smaller than the diameter of the unstretched resizing sleeve. At the ends of the tool, there are plugs 105, 106, which make the pipe airtight. The plug 105 has a valve, through which overpressure can be conducted into the pipe. Overpressure causes an expansion of the diameter of the resizing sleeve stretching area 103 and the installation area 102 to the same size as the diameter of the installation hat preparation area 101. The exterior diameter of the installation hat preparation area 101, like the exterior diameter of the entire tool when overpressure has been conducted into the pipe, is preferably the same as the interior diameter of the thicker pipe of the pipe assembly to be lined.

One purpose of the stabilization sleeve of the installation area 102 is to assure that the head of the resizing sleeve to be prepared, onto which the installation hat is installed, stretches without wrinkles against the installation tool, when overpressure is conducted into the tool 100.

FIG. 1b shows the first stage of operation in preparing a resizing sleeve 111 for installation. In order that the resizing sleeve can be installed in a pipe assembly that comprises pipes of thinner and thicker interior diameter, as well as the joining point between these, an installation hat 110 must be attached in an airtight manner to its head. An airtight installation hat 110 removeably attached to the resizing sleeve is needed in the installation with overpressure of a resizing sleeve 111 into place at the joining point of the pipe assembly. In the first stage of operation in preparing the resizing sleeve, the head of the resizing sleeve is pulled onto the resizing sleeve stretching area of the tool 103 and also partially onto the installation hat installation area 102. The installation hat 110, which can be of a suitable, flexible but also inelastic material, for example, a pipe-like piece of 0.4 mm thick PU plastic, is placed into the installation hat preparation area 101 of the tool.

FIG. 1c shows the second stage of operation of the preparation. At the opposite end of the installation hat 110, preferably, at an oblique angle in relation to the perpendicular cross-section of the resizing sleeve, for example, at a 15-75 degree angle, more preferably at 30-60 degree, most preferably at a 45 degree angle, a adhesive strip 112 is spread. Adhesive can also be spread on the surface of the resizing sleeve, for example, to a part located in its installation area 102. Overpressure is formed inside the tool by pumping air into it through the valve of the plug 105. In this case, all three areas 101, 102 and 103 of the tool swell in diameter to the same thickness and stretch the resizing sleeve 111 to the thickness of the thicker pipe in the pipe assembly. Now, the installation hat 110 can be installed and airtightly glued onto the resizing sleeve 111 in the installation hat installation area 102. This stage of operation is shown in FIG. 1d.

The installation hat 110 is pulled over the installation area 102 onto the resizing sleeve 111 such that, along its entire length, the adhesive strip 112 is touching the surface of the resizing sleeve. The adhesive of the adhesive strip 112 can be, for example, hot-setting adhesive, which adheres suitably to the resizing sleeve as the adhesive strip is heated. When the installation hat 110 has adhered to the stretched resizing sleeve, overpressure can be released from the tool 100 and the prepared resizing sleeve along with its installation hat removed from the tool. The installation hat is now airtightly attached to the resizing sleeve, whose diameter returns back to the size of the diameter of the thinner pipe in the pipe assembly to be lined. The other end of the installation hat can now be airtightly closed, for example, with a suitable rope. The resizing sleeve and the installation hat are now ready for installation in a pipe assembly to be lined, for example, a branch joining point of a sewage pipeline of a residential building. The rope can later be used in connection with installation of the sleeve for removing the installation hat from the lined pipe assembly.

FIG. 2a shows the installation of the resizing sleeve 203 prepared according to the description above into the branch joining point of a pipe assembly comprising pipes of thicker 201 and thinner 202 diameter. The resizing sleeve 203, saturated with epoxy resin, is installed in place by conducting overpressure into the sleeve. Overpressure remains in the sleeve in the stage of preparation shown in FIGS. 1a-d due to the installation hat 204 (110 in FIGS. 1a-d) airtightly glued to the sleeve. Overpressure is maintained in the sleeve, until the sleeve has firmly adhered to the interior surfaces of the pipes 201 and 202 and has cured to a rigid structure. After this, overpressure can be conducted out of the sleeve and the installation hat 204 can be pulled away by means of the rope 205 attached to the hat. Because the adhesive strip (112 in FIG. 1c) is located at an oblique position, for example, at a 45 degree angle in relation to the perpendicular cross-section of the resizing sleeve, removal of the installation hat 204 succeeds easily by pulling on the rope 205.

At this stage, the resizing sleeve 203 is in place and the joining point of the pipe assembly 200 has been lined, but the liner sleeve 203 has blocked the pipe 201 of the trunk line. FIG. 2b shows, how the pipe 201 can be opened by drilling a hole in the cured liner sleeve 203 with a suitable drill and/or sanding device 206 from the pipe 201. FIG. 2c shows a resulting joining point lined with a resizing sleeve.

To the person skilled in the art it is obvious that the exemplified embodiments presented above are, for purposes of clarity, relatively simple both in structure and function.

Following the model presented in this patent application it is possible to construct different and quite complicated solutions that utilize the inventive thought presented in this patent application.

The invention claimed is:

1. A liner assembly comprising:
   a resizing sleeve which is a stretching sleeve having an unstretched state having a smaller diameter and a stretched state having a larger diameter; and
   an installation hat which is made of flexible and inelastic material and having a diameter essentially matching the diameter of the resizing sleeve in the stretched state,
   wherein the installation hat is removably attached to the resizing sleeve in an airtight manner at an oblique angle in relation to a perpendicular cross-section of the resizing sleeve.

2. The liner assembly of claim 1, wherein the installation hat is attached to the resizing sleeve with glue.

3. The liner assembly of claim 1, wherein the installation hat is attached to the resizing sleeve with hot-setting adhesive.

4. The liner assembly of claim 1, wherein the oblique angle is between 15° and 75°.

5. The liner assembly of claim 1, wherein the oblique angle is between 30° and 60°.

* * * * *